(12) United States Patent
Huang (10) Patent No.: US 8,960,918 B2
(45) Date of Patent: Feb. 24, 2015

(54) LIGHT SOURCE SYSTEM FOR A STEREOSCOPIC PROJECTION APPARATUS

(71) Applicant: Delta Electronics, Inc., Taoyuan Hsien (TW)

(72) Inventor: Junejei Huang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 131 days.

(21) Appl. No.: 13/799,639

(22) Filed: Mar. 13, 2013

(65) Prior Publication Data

US 2014/0153246 A1    Jun. 5, 2014

(30) Foreign Application Priority Data

Dec. 5, 2012  (TW) .............................. 101145598 A (51) Int. Cl.
G03B 21/00 (2006.01)
F21V 9/08 (2006.01)
G03B 1/00 (2006.01)

(52) U.S. Cl.
CPC .... F21V 9/08 (2013.01); G03B 1/00 (2013.01)
USPC ................... 353/31; 353/30; 353/37; 353/84; 353/94; 353/98; 362/84; 362/284

(58) Field of Classification Search
CPC ............. G03B 21/204; G03B 21/2013; H04N 9/3114; H04N 9/3161
USPC ............. 353/7, 30, 31, 37, 38, 84, 85, 88, 94, 353/98; 362/84, 268, 284, 324; 348/743–747
See application file for complete search history.

(56) References Cited

U.S. PATENT DOCUMENTS

| | | | |
|---|---|---|---|
| 6,795,249 B2 | 9/2004 | Shioya |
| 6,812,979 B2 | 11/2004 | Um |
| 6,830,343 B2 | 12/2004 | Song |
| 6,877,860 B2 | 4/2005 | Cho et al. |
| 6,971,751 B2 | 12/2005 | Wang |
| 7,230,656 B2 | 6/2007 | Penn et al. |
| 7,621,638 B2 | 11/2009 | Su et al. |
| 7,832,869 B2 | 11/2010 | Maximus et al. |
| 8,004,761 B2 | 8/2011 | Chien et al. |
| 2010/0208342 A1 | 8/2010 | Olsen |

(Continued)

FOREIGN PATENT DOCUMENTS

| | | |
|---|---|---|
| CN | 1742227 A | 3/2006 |
| JP | 2005189428 A | 7/2005 |

(Continued)

*Primary Examiner* — Sultan Chowdhury
(74) *Attorney, Agent, or Firm* — Muncy, Geissler, Olds & Lowe, P.C.

(57) ABSTRACT

A light source system for a stereoscopic projection apparatus is provided. The light source system has a light source module, a first lens unit, a light splitting element, a color wheel module and a light integration element. The light source module provides a light beam, which is transferred by the first lens unit to the light splitting element. Then, the light beam is split by the light splitting element into a first light beam with a first bandwidth and a second light beam with a second bandwidth. The first and the second light beams are then received and transformed by the color wheel into a third light beam and a fourth light beam which are then transmitted to the light integration element. With the above arrangement, the light source system can be applied on a projection apparatus to provide a stereoscopic image.

18 Claims, 11 Drawing Sheets

(56) References Cited

U.S. PATENT DOCUMENTS

2010/0328554 A1* 12/2010 Shibasaki .................... 348/760
2013/0229634 A1*  9/2013 Hu et al. ........................ 353/84
2013/0271954 A1* 10/2013 Li et al. .......................... 362/84

FOREIGN PATENT DOCUMENTS

| TW | 200736686 | 10/2007 |
| TW | 201011444 A | 3/2010 |
| TW | I340290 | 4/2011 |

* cited by examiner

LIGHT SOURCE SYSTEM FOR A STEREOSCOPIC PROJECTION APPARATUS

CROSS-REFERENCES TO RELATED APPLICATIONS

This application claims priority to Taiwan Patent Application No. 101145598 filed on Dec. 5, 2012, which is hereby incorporated herein by reference in its entirety.

BACKGROUND OF THE INVENTION

1. Field of the Invention

The present invention relates to a light source system, and more particularly, to a light source system for use in a stereoscopic projection apparatus.

2. Descriptions of the Related Art

Conventional light source systems for use in stereoscopic projection apparatuses mostly adopt a color wheel or two liquid crystal switches for light splitting. In either method, a light beam generated by such a light source system can be transformed and divided into a left-eye and a right-eye view-angle image. Then, the left-eye and the right-eye view-angle images are projected by a plurality of digital module devices to the visual fields of a viewer. Hereinbelow, basic design principles and bottlenecks of the two kinds of light source systems will be described briefly.

First, a light source system adopting a color wheel as a light splitting element will be described. For example, an RGB color wheel must have at least six color filtering regions, with the left eye and the right eye corresponding to three color filtering regions (i.e., a red filtering region, a green filtering region and a blue filtering region) respectively. In practical operation, the viewer can watch a stereoscopic image by simply wearing a pair of passive eyeglasses. However, this arrangement has a shortcoming in that because the color wheel must cover at least six large-area filtering regions for an incident light beam to be incident on the color filter at a small angle, it is difficult to reduce the volume of the color wheel. In other words, this makes it difficult to miniaturize the stereoscopic projection light source system.

Next, a light source system that adopts liquid crystal switches as a light splitting element will be described. The liquid crystal switches need not to be actuated by a mechanism, so mechanical wearing can be avoided. However, the liquid crystal switches must operate at a precision higher than that of the color wheel. Therefore, the problem of synchronism must be particularly considered in the design; otherwise, it will be difficult for the viewer to see a stereoscopic image or the quality of the stereoscopic image seen by the viewer will become poor. Briefly, the light source system adopting liquid crystal switches is complex and it is difficult to lower the cost thereof.

Accordingly, there is a need existing in the art to design a light source system that can be used with a pair of passive glasses, improve the light utilization factor, and have a low cost, a simplified optical arrangement, a high resolution, a miniaturized volume or increased brightness.

SUMMARY OF THE INVENTION

An objective of the present invention is to provide a light source system for a stereoscopic projection apparatus.

Another objective of the present invention is to provide a light source system having an improved light utilization factor, a high resolution and increased brightness.

A further objective of the present invention is to provide a light source system having a low cost and a simplified optical arrangement.

Yet another objective of the present invention is to provide a light source system with a miniaturized volume.

To achieve the aforesaid objective, the light source system of the present invention comprises a light source module, a first lens unit, a light splitting element, a color wheel module and a light integration element.

The light source module is adapted to provide a light beam. The light beam is received by the first lens unit and then received by the light splitting element. The light splitting element is adapted to split the light beam into a first light beam with a first bandwidth and a second light beam with a second bandwidth. The first light beam and the second light beam are then received and transformed by the color wheel module into a third light beam with a third bandwidth and a fourth light beam with a fourth bandwidth, which then enter the light integration element. The light integration element has a light incident surface and a light exiting surface. The light incident surface is optically coupled to the color wheel module. In other words, the third light beam and the fourth light beam enter the light integration element via the light incident surface.

The color wheel module further has a wheel which is comprised of a plurality of first glass pieces and a plurality of second glass pieces arranged radially. Each of the first glass pieces includes a first filtering region, a first reflective region and a second reflective region; and each of the second glass pieces includes a second filtering region and a third reflective region. The first and the second filtering regions and the first and the third reflective regions are disposed at the first side of the wheel. The first filtering region and the third reflective region are adjacent to an axis of the wheel, and the second reflective region is disposed at the second side of the wheel which is opposite to the first side.

The operations of the light source system of the present invention may be divided into a first time sequence and a second time sequence; the first time sequence and the second time sequence are interchangeable.

At the first time sequence, the first light beam is transmitted to the first filtering region of one of the first glass pieces and a third light beam with a third bandwidth of the first light beam passes through the first filtering region. The second light beam is reflected by the third reflective region of one of the second glass pieces.

At a second time sequence, the first light beam is reflected by the first reflective region of one of the second glass pieces, while the second light beam is transmitted to the second filtering region of one of the second glass pieces and a fourth light beam with a fourth bandwidth of the second light beam passes through the second filtering region.

With the aforesaid arrangement, a projection apparatus comprising the light source system of the present invention allows a user to see a plurality of view-angle images, and the purpose of providing a light source system having an improved light utilization factor, a low cost, a simplified optical arrangement and a high resolution is achieved.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following descriptions, the present invention will be explained with reference to embodiments thereof. The present invention provides a light source system for use in a stereoscopic projection apparatus. It shall be appreciated that in the following embodiments and the attached drawings, the description of these embodiments is only for the purpose of illustration rather than to limit the present invention. It shall also be appreciated that in the following embodiments and the attached drawings, elements unrelated to the present invention are omitted from depiction. The number of elements and dimensional relationships among the individual elements in the attached drawings are illustrated only for ease of understanding, but not to limit the actual scale, sizes and numbers.

Figure 1:
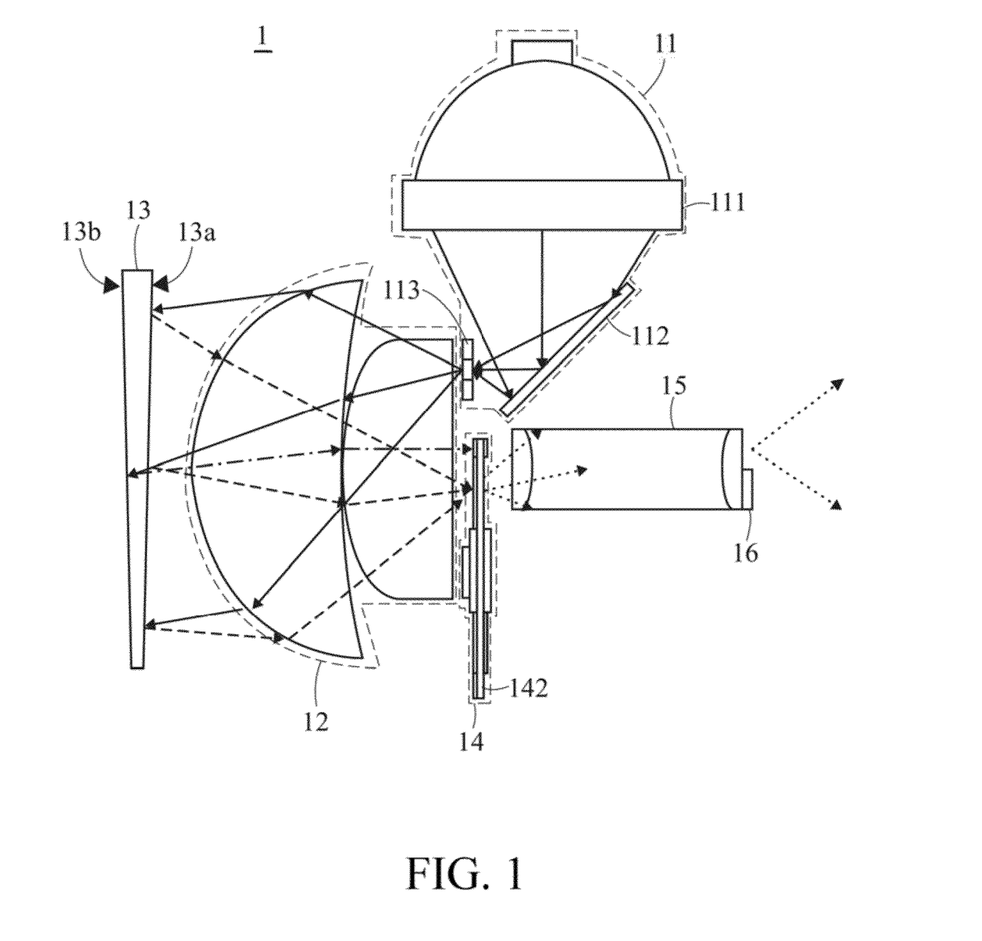
FIG. 1 is a schematic view of a light source system according to the first embodiment of the present invention at a first time sequence.
Figure 2A:
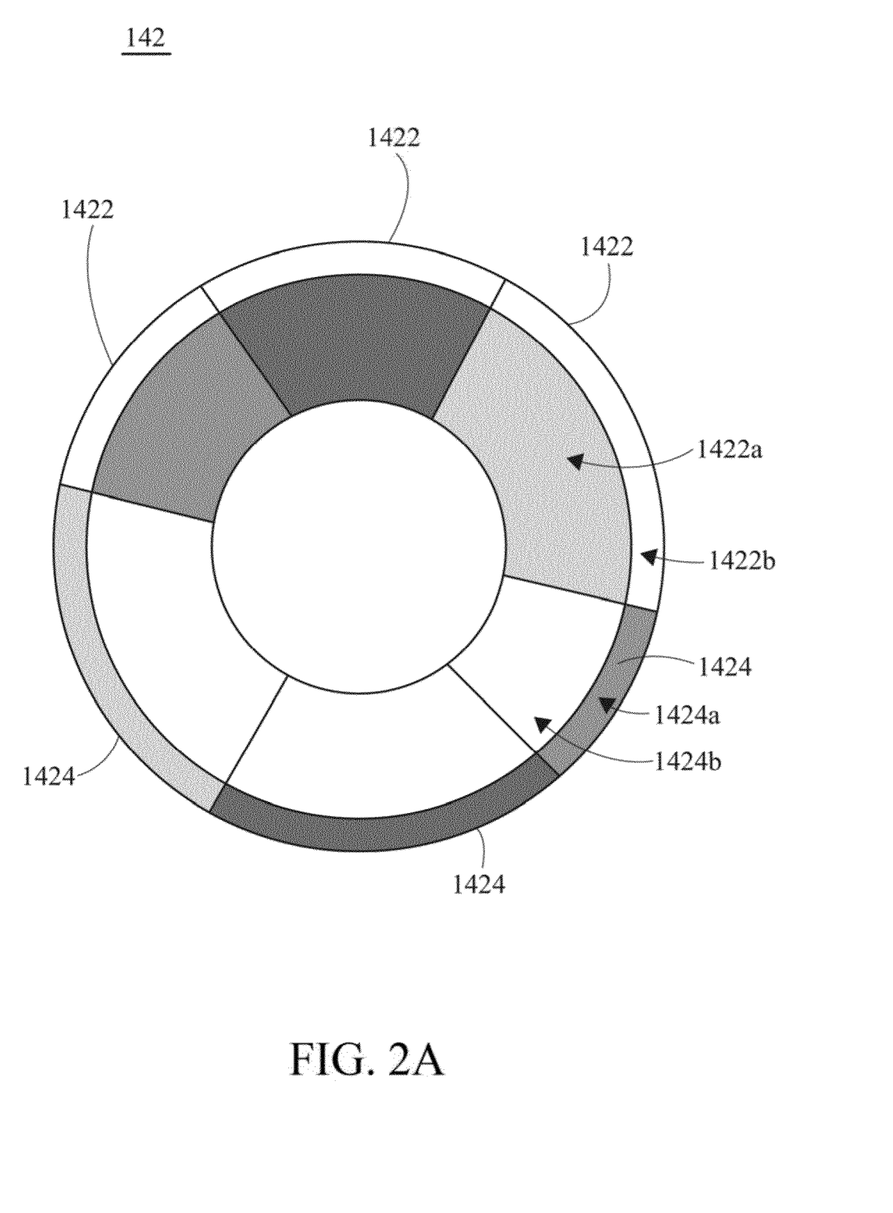
FIG. 2A is a front view of a wheel of a color wheel module shown in FIG. 1.
Figure 2B:
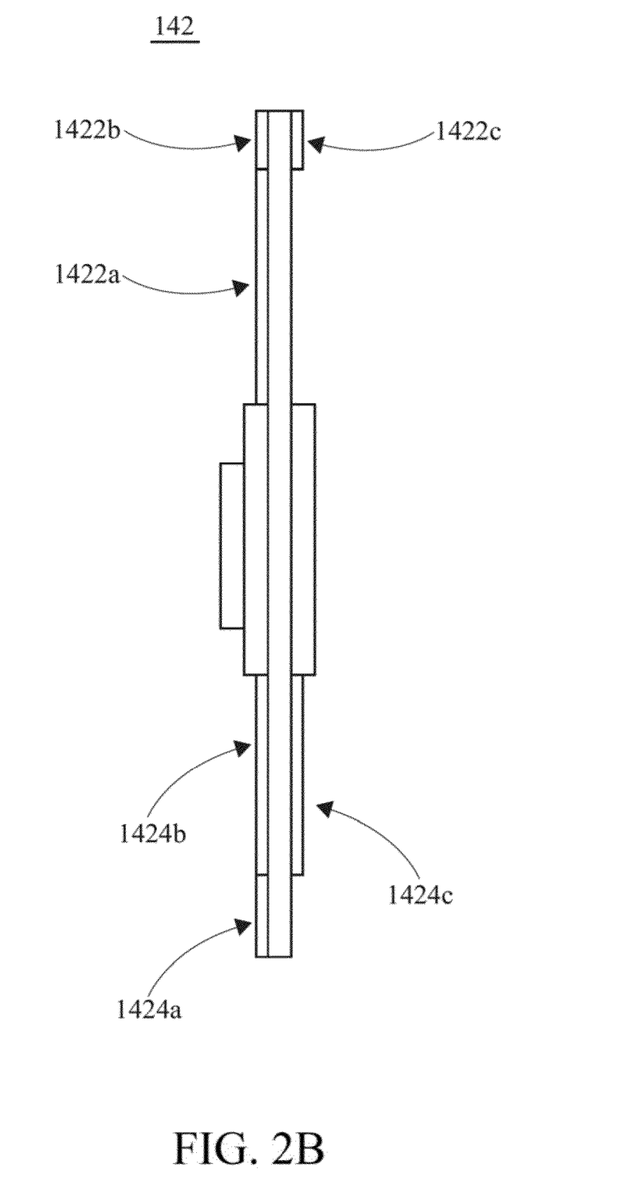
FIG. 2B is a schematic side view of the wheel of the color wheel module shown in FIG. 1.
Figure 3:
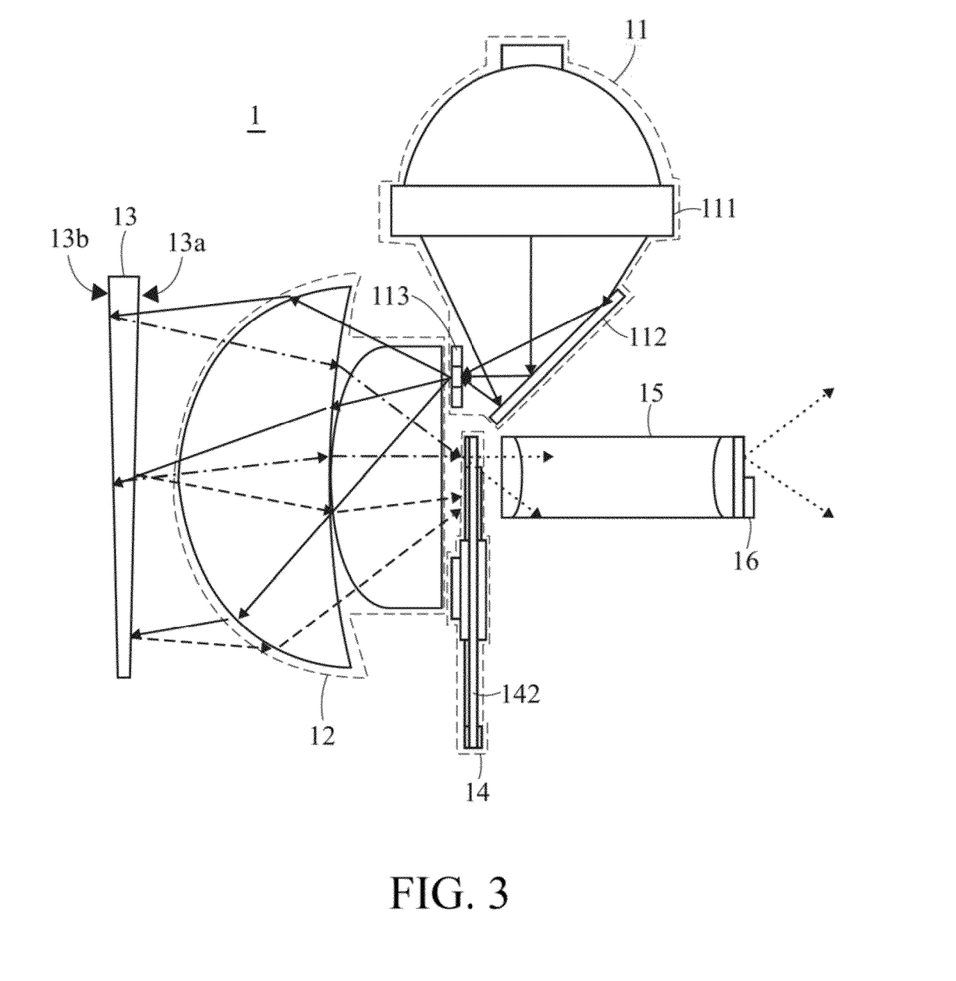
FIG. 3 is a schematic view of the light source system according to the first embodiment of the present invention at a second time sequence.
Figure 4:
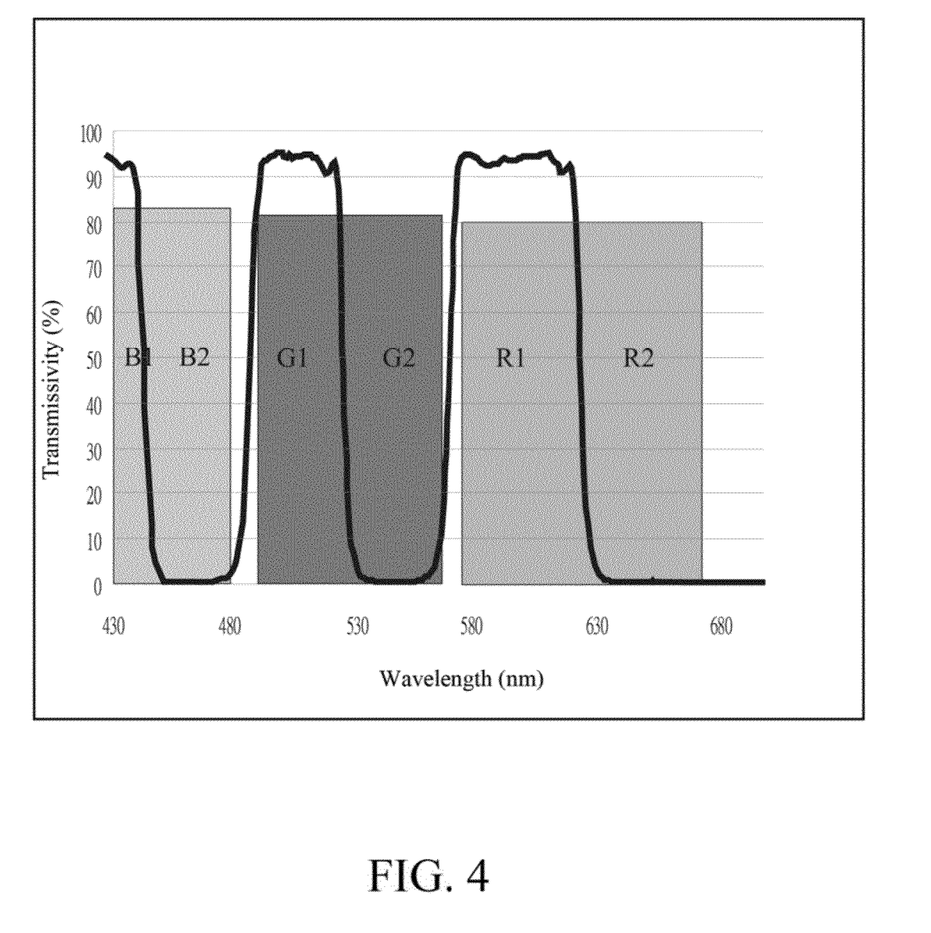
FIG. 4 is a schematic view illustrating bandwidth versus transmissivity of a filtering surface of a light splitting element of the light source system according to the present invention.

FIGS. 1 and 3 are schematic views of a light source system 1 according to the first embodiment of the present invention at different time sequences; FIGS. 2A to 2B are an enlarged front view and a schematic side view of a color wheel module of the light source system 1 respectively; and FIG. 4 is a schematic view illustrating the wavelength versus transmissivity of a filtering surface 13a of a light splitting element of the light source system 1.

The light source system 1 of the present invention comprises a light source module 11, a first lens unit 12, a light splitting element 13, a color wheel module 14 and a light integration element 15. The color wheel module 14 further comprises a wheel 142. The light integration element 15 has a light exiting surface a light incident surface (not labeled) with the light incident surface optically coupled to the color wheel module 14.

To facilitate the understanding of relative relationships among the individual elements, the wheel 142 of the color wheel module 14 may be further defined to have a first side (i.e., a left side of the wheel) and a second side (i.e., a right side of the wheel), and the relative positions among the individual elements will be described with reference to the first side and the second side. Thus, as shown in FIG. 1, the first lens unit 12 and the light splitting element 13 are disposed at the first side of the wheel 142 of the color wheel module 14 while the light integration element 15 is disposed at the second side of the wheel 142 in this embodiment.

Hereinbelow, the functions and efficacies of the light source module 11, the first lens unit 12, the light splitting element 13, the color wheel module 14 and the light integration element 15 will be described in sequence firstly, and then the implementation and operations of the light source system 1 of the present invention will be explained.

Additionally, the term "optically coupled" as used herein generally refers to the transfer of light beams between the involved optical elements; that is, if two optical elements are optically coupled, it means that a light beam from one of the two optical elements can be transferred to the other.

Firstly, the light source module 11 of the light source system 1 of this embodiment will be introduced. The light source module 11 is adapted to provide a light beam. In this embodiment, the light source module 11 further comprises an ultra-high pressure lamp (UHP lamp) 111, a reflective mirror 112 and a spatial filter 113. However, the light source is not limited to the UHP lamp 111, but may also be an Xenon lamp or a solid-state light source.

In detail, the UHP lamp 111 is adapted to provide the light beam. The light beam is reflected by the reflective mirror 112 and filtered by the spatial filter 113, and is then transferred to the first lens unit 12. The reflective mirror 112 is adapted to direct the light beam to the first lens unit 12, and the spatial filter 113 is adapted to filter scattered light and diffracted light from the UHP lamp 111 to reduce the overall noises and improve the image quality. Although a combination of the UHP lamp 111 with the reflective mirror 112 and the spatial filter 113 is used in this embodiment, the use of the reflective mirror 112 and the spatial filter 113 is not required. It is possible that only a UHP lamp 111 is used in the light source module 11 in which case the light beam generated by the light source module 11 will enter the first lens unit 12 directly.

Next, the first lens unit 12 of the light source system 1 of this embodiment will be introduced. The first lens unit 12 is adapted to receive the light beam generated by the light source module 11. Furthermore, the first lens unit 12 of this embodiment comprises two lenses, through which the light beam is converged and transferred to the light splitting element 13 and converged and transferred to the first side of the wheel 142 of the color wheel module 14.

The light splitting element 13 is adapted to receive the light beam transferred by the first lens unit 12, and split the light beam into a first light beam (denoted by a dashed line) with a first bandwidth and a second light beam (denoted by a chain line) with a second bandwidth. For ease of understanding, the light beams of different bandwidths are denoted by different kinds of lines herein.

Specifically, the light splitting element 13 of this embodiment is a wedge reflector (i.e., a wedge-shaped reflector), and further comprises a filtering surface 13a and a reflective surface 13b oblique to the filtering surface 13a (an angle, which is preferably 5° to 10°, is included therebetween). The filtering surface 13a and the reflective surface 13b are plated with different metal films. The filtering surface 13a of the light splitting element 13 only reflects the first light beam (denoted by the dashed line) with the first bandwidth and allows light beams with other bandwidths to pass therethrough. The light beams with the other bandwidths that pass through the filtering surface 13a are reflected by the reflective surface 13b and then exit from the light splitting element 13 in the same direction as the first light beam.

FIG. 4 illustrates a schematic view of the bandwidth versus transmissivity of the filtering surface 13a of the light splitting element 13. The filtering surface 13a of this embodiment can reflect light beams with bandwidths B2, G2 and R2 shown therein, and allow light beams with bandwidths B1, G1 and R1 to pass therethrough. The light beams with the bandwidths B1, G1 and R1 that pass therethrough are then reflected by the reflective surface 13b and then exit from the light splitting element 13. In other words, each of the "first bandwidth" and the "second bandwidth" described herein is not a continuous bandwidth, but is a set of bandwidths.

With this arrangement, a light beam can be split into the first light beam (denoted by the dashed line) with the first bandwidth and the second light beam (denoted by the chain line) with the second bandwidth that are both separate from each other.

Then, the color wheel module 14 will be described. The color wheel module 14 of this embodiment is disposed between the first lens unit 12 and the light integration element 15. The color wheel module 14 is adapted to transform the first light beam and the second light beam into a third light beam with a third bandwidth and a fourth light beam with a fourth bandwidth respectively.

Please refer to FIGS. 2A and 2B together. The color wheel module 14 further comprises a wheel 142, which is comprised of a plurality of first glass pieces 1422 and a plurality of second glass pieces 1424 arranged radially. The first glass pieces 1422 are radially symmetrical to the second glass pieces 1424 respectively. In this embodiment, three first glass pieces 1422 and three second glass pieces 1424 are taken as an example, and the first glass pieces 1422 are disposed adjacent to each other (the second glass pieces 1424 are also disposed adjacent to each other); however, the numbers of and the arrangement of the first glass pieces 1422 and three second glass pieces 1424 are not limited thereto.

In detail, each of the first glass pieces 1422 comprises a first filtering region 1422a, a first reflective region 1422b and a second reflective region 1422c. The first filtering region 1422a and the first reflective region 1422b are disposed at the first side of the wheel 142, and the second reflective region 1422c is disposed at the second side of the wheel 142 that is opposite to the first side. The first filtering region 1422a is adjacent to an axis of the wheel 142. That is, the first reflective region 1422b may be viewed as an outer ring (i.e., farther from the axis) of the wheel 142, and the first filtering region 1422a may be viewed as an inner ring (i.e., nearer to the axis) of the wheel 142.

In this embodiment, the first filtering regions 1422a of the three first glass pieces 1422 are a red filtering region, a green filtering region and a blue filtering region respectively, which are represented by different gray-scale colors in the attached drawing. The red filtering region, the green filtering region and the blue filtering region may correspond to the R2 bandwidth, the G2 bandwidth and the B2 bandwidth (see FIG. 4) of the first bandwidth of the first light beam respectively so that the first light beam passing through the red filtering region, the green filtering region and the blue filtering region is transformed into a third light beam with a third bandwidth (for this embodiment, the third light beam may be a red light beam, a blue light beam or a green light beam).

Additionally, the first reflective region 1422b and the second reflective region 1422c are disposed at opposite sides of the wheel 142 and symmetric with each other. Each of the second glass pieces 1424 comprises a second filtering region 1424a as well as a third reflective region 1424b and a fourth reflective region 1424c. The second filtering region 1424a and the third reflective region 1424b are both disposed at the first side of the wheel 142, and the fourth reflective region 1424c is disposed at the second side of the wheel 142 that is opposite to the first side. The third reflective region 1424b is adjacent to an axis of the wheel 142. That is, the third reflective region 1424b is disposed in the inner ring (i.e., nearer to the axis) of the wheel 142, while the second filtering region 1424a is disposed in the outer ring of the wheel 142 (farther from the axis).

Similarly, the second filtering regions 1424a of the three second glass pieces in this embodiment are a red filtering region, a green filtering region and a blue filtering region respectively. Also similarly, the red filtering region, the green filtering region and the blue filtering region may correspond to the R1 bandwidth, the G1 bandwidth and the B1 bandwidth (see FIG. 4) in the second bandwidth of the second light beam respectively so that the second light beam passing through the red filtering region, the green filtering region and the blue filtering region is transformed into a fourth light beam with a fourth bandwidth (for this embodiment, the fourth light beam may be a red light beam, a blue light beam or a green light beam).

It shall be further appreciated that for the purpose of indicating the relative positions of the elements clearly, members (e.g., a motor, a detector and etc.) of the color wheel module 14 other than the wheel 142 have been omitted herein.

Finally, the light integration element 15 of the light source system 1 of the present invention will be described. The light integration element 15 is adapted to uniformize the third light beam and the fourth light beam transformed by the color wheel module 14, and provide the uniformized light beams to a projection apparatus (not shown). Specifically, the light integration element 15 further comprises a light incident surface and a light exiting surface. A lens whose focus is located on the light exiting surface may be disposed behind the light incident surface, and a lens whose focus is located on the light incident surface may be disposed in front of the light incident surface. The light incident surface is optically coupled to the color wheel module 14, while the light exiting surface is optically coupled to the projection apparatus. The light integration element 15 may be a light integration rod in this embodiment, although it is not limited thereto.

Additionally, the light source system 1 of this embodiment further comprises a light path adjusting element 16 disposed on the light exiting surface of the light integration element 15 and optically coupled to the second reflective regions 1422c of the first glass pieces 1422. The light path adjusting element 16 functions to avoid the Etendue of the light source system 1 from becoming excessively large and to ease overfilling at a light valve of the projection apparatus to improve the overall light utilization factor. The light path adjusting element 16 is a lens in this embodiment; however, it is also possible in an example that the light exiting surface of the light integration element 15 is partially plated with a reflective film to achieve an effect similar to that of this embodiment. It shall be appreciated that the light path adjusting element 16 is a member used to optimize the light source system 1, but is not required in the present invention.

Furthermore, after a light beam provided by the light source module 1 is split by the light splitting element 13 into a first light beam with a first bandwidth and a second light beam with a second bandwidth, the operation of the light source system 1 may be divided into a first time sequence and a second time sequence according to the optical coupling of the first light beam and the second light beam with the color wheel module 14. Hereinbelow, the operation of the light source system 1 is divided into a "first time sequence" and a "second time sequence" for ease of understanding and description; however, this is only intended to ease the description, but is not to limit the operation sequence of the light source system 1. In practical operation, the light source system 1 is switched between the first time sequence and the second time sequence alternately.

With reference back to FIG. 1, optical coupling between the first glass pieces 1422 of the color wheel module 14 and the first and the second light beams is defined as the "first time sequence". At the first time sequence, the first and the second light beams are converged by the first lens unit 12 to a first filtering region 1422a and a second reflective region 1422b of the first glass pieces 1422 respectively. The first light beam (denoted by the dashed line) passes through the first filtering region 1422a of one of the first glass pieces 1422, and the second light beam (denoted by the chain line) is reflected by the third reflective region 1424b of one of the second glass pieces 1424. After the first light beam passes through the first glass piece 1422, only a third light beam with a third bandwidth of the first light beam will pass through the first filtering region 1422a.

The first light beam with the first bandwidth is transformed by the first filtering region 1422a into the third light beam with the third bandwidth, which is then transmitted through the first filtering region 1422a to the second side of the wheel 142 and enters the light integration element 15. When the first light beam reaches an exit of the light integration element 15, a half of the first light beam passes through half of the exit that is not provided with the light path adjusting element 16 and exits from the light exiting surface directly, while the other half of the first light beam is reflected by the light path adjusting element 16. The other half of the first light beam that is reflected is converged by the lens disposed at the exit to the third reflective region 1424b of the first glass piece 1422 and then converged by the lens disposed at the inlet to the half of the exit that is not provided with the light path adjusting element 16 to exit therefrom. It shall be appreciated that the third bandwidth described herein is covered within the first bandwidth.

If the first filtering region 1422a is, for example, a red filtering region, then the first light beam entering the red filtering region is transformed into a red light beam with the R1 bandwidth (see FIG. 4). The red light beam enters the light integration element 15 where it is uniformized, and is then transformed and combined into an image by the projection apparatus. By having the red filtering region, the green filtering region and the blue filtering region of the three first glass pieces 1422 coupled with the first light beam sequentially, a red light beam (R1), a green light beam (B1) and a blue light beam (G1) can be generated respectively. The red light beam (R1), the green light beam (B1) and the blue light beam (G1) are then uniformized, and are transformed and combined into a view-angle image (e.g., a right-eye image) by the projection apparatus. On the other hand, the second light beam (denoted by the chain line) reflected by the third reflective region 1424b is blocked at the first side of the color wheel module 14.

With reference to FIG. 3, optical coupling between the second glass pieces 1424 of the color wheel module 14 and the first and the second light beams is defined as the "second time sequence". At the second time sequence, the first and the second light beams are converged by the first lens unit 12 to the third reflective region 1424b and the second filtering region 1424a respectively. The first light beam (denoted by the dashed line) is reflected by the third reflective region 1424b of one of the second glass pieces 1424, and the second light beam (denoted by the chain line) passes through the second filtering region 1424a of one of the second glass pieces 1424. The second filtering region 1424a only allows a fourth light beam with a fourth bandwidth to pass therethrough.

The second light beam with the second bandwidth is transformed by the second filtering region 1424a into the fourth light beam with the fourth bandwidth. The fourth light beam travels to the second side of the wheel 142 and enters the light integration element 15 where it exits from the light exiting surface of the light integration element 15. It shall be appreciated that the fourth bandwidth described herein is covered within the second bandwidth.

If the second filtering region 1424a is, for example, a red filtering region, then the second light beam entering the red filtering region is transformed into a red light beam with the R2 bandwidth (see FIG. 4). The red light beam enters the light integration element 15 where it is uniformized, and is then transformed and combined into an image by the projection apparatus. By having the red filtering region (R2), the green filtering region (G2) and the blue filtering region (B2) of the three second glass pieces 1424 optically coupled with the second light beam sequentially, a red light beam, a green light beam and a blue light beam can be generated respectively. The red light beam, the green light beam and the blue light beam are then uniformized by the light integration element 15, and are transformed and combined into a view-angle image (e.g., a left-eye image) by the projection apparatus. On the other hand, the first light beam (denoted by the dashed line) reflected by the third reflective region 1424b is blocked at the first side of the color wheel module 14.

Briefly, the first light beam is transformed into the third light beam at the first time sequence, while the second light beam is transformed into the fourth light beam at the second time sequence. Through the alternate arrangement of the first time sequence and the second time sequence, a stereoscopic image can be formed by the projection apparatus comprising the light source system 1, thus, achieving the objective of the present invention.

Figure 5:
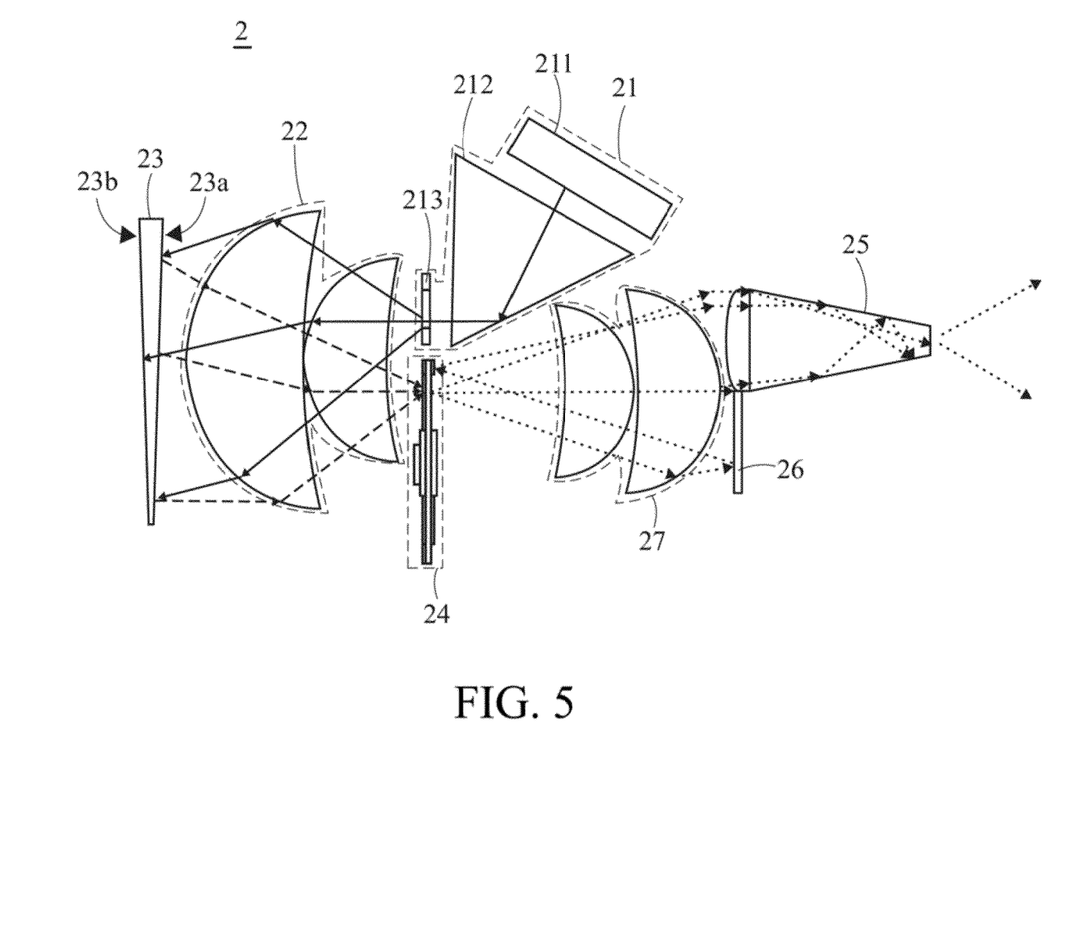
FIG. 5 is a schematic view of the light source system according to the second embodiment of the present invention at a first time sequence.
Figure 6:
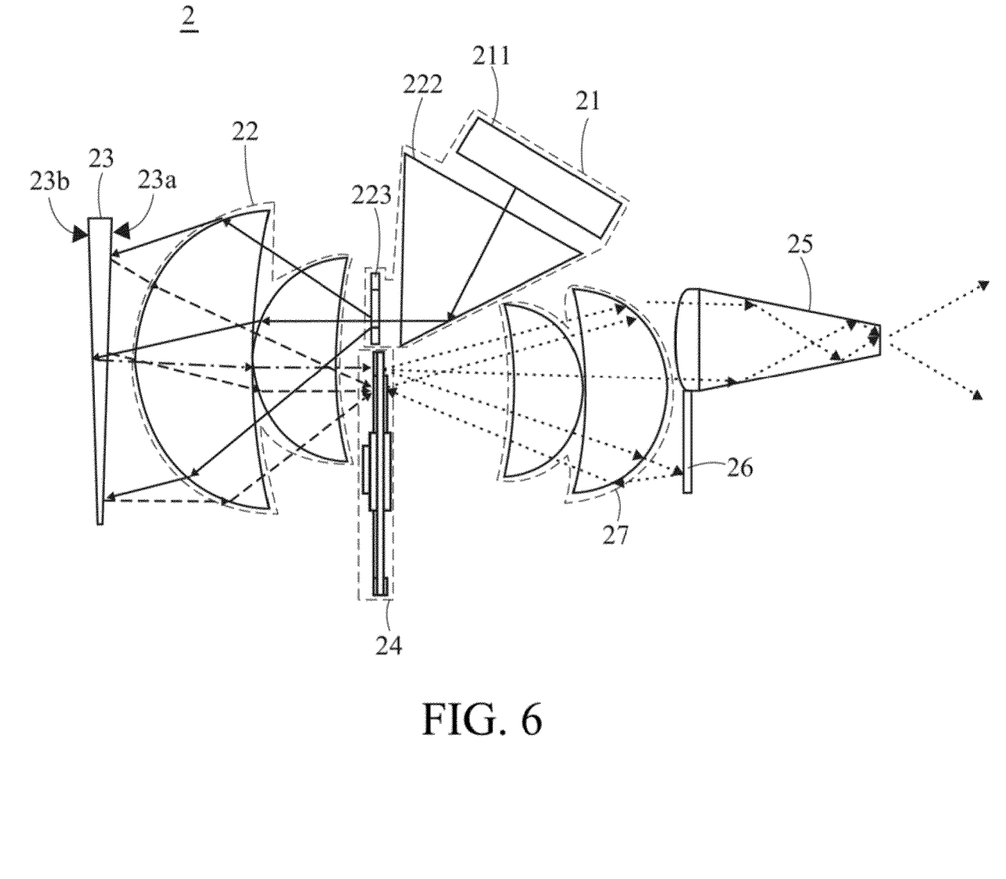
FIG. 6 is a schematic view of the light source system according to the second embodiment of the present invention at a second time sequence.

FIGS. 5 and 6 respectively are schematic views of a light source system 2 according to the second embodiment of the present invention at a first time sequence and at second time sequence respectively. The second embodiment differs from the first embodiment in that (1) a prism 212 is used in a light source module 21 of this embodiment in place of the reflective mirror 112 of the first embodiment; (2) this embodiment further comprises a second lens unit 27 disposed between the color wheel module 24 and the light integration element 25; and (3) a light path adjusting element 26 of this embodiment is disposed adjacent to a light incident surface of the light integration element 25.

Hereinbelow, only the differences between the second embodiment and the first embodiment will be described, while other relationships and functions of elements will not be further described herein.

The light source module 21 of the second embodiment comprises a UHP lamp 211, a prism 212 and a spatial filter 213. A light beam can travel within the prism 212. The prism 212 is used to replace the reflective mirror 112 of the first embodiment to transfer the light beam provided by the UHP lamp 211 into the spatial filter 213 and the first lens unit 22. Preferably, the prism 212 may be plated with a reflective film on one side thereof so that an effect similar to that of the reflective mirror 112 can be achieved.

Additionally, the second lens unit 27 of the second embodiment and the light path adjusting element 26 are both disposed at the second side of a wheel (not labeled) of the color wheel module 24, and the second lens unit 27 is optically coupled to the color wheel module 24 and a light incident surface of the light integration element 25. The light path adjusting element 26 is optically coupled to the second reflective regions of the first glass pieces (not shown) of the color wheel module 24.

With reference to FIG. 5, a first light beam is optically coupled to the first glass pieces of the wheel of the color wheel module in the first time sequence so that the first light beam is transformed into a third light beam with a third bandwidth. The third light beam exiting from the color wheel module 24 travels to the second lens unit 27 and is then converged to the light path adjusting element 26. The light path adjusting element 26 is also a reflective mirror in the second embodiment. Accordingly, the third light beam is reflected by the light path adjusting element 26 into the second lens unit 27, optically coupled to (i.e., reflected by in this embodiment) the second reflective regions of the first glass pieces of the wheel of the color wheel module 24, and then transferred to the light integration element 25.

With reference to FIG. 6 next, in the second embodiment, the second light beam is optically coupled to the second glass pieces (not shown) of the wheel of the color wheel module 24 at the second time sequence, and is transformed into a fourth light beam with a fourth bandwidth. The fourth light beam exiting from the color wheel module 24 travels to the second lens unit 27 and then enters the light integration element 25 directly.

Briefly, with the arrangement of the second embodiment, the third light beam is firstly optically coupled to the light path adjusting element 26 and the second reflective regions of the first glass pieces before it enters the light integration element 25. On the other hand, the fourth light beam firstly passes through the second lens unit 27 before it enters the light integration element 25. However, the effect of the light source system 2 of the second embodiment and how it cooperates with the projection apparatus are similar to those of the first embodiment and, thus, will not be further described herein.

Figure 7:
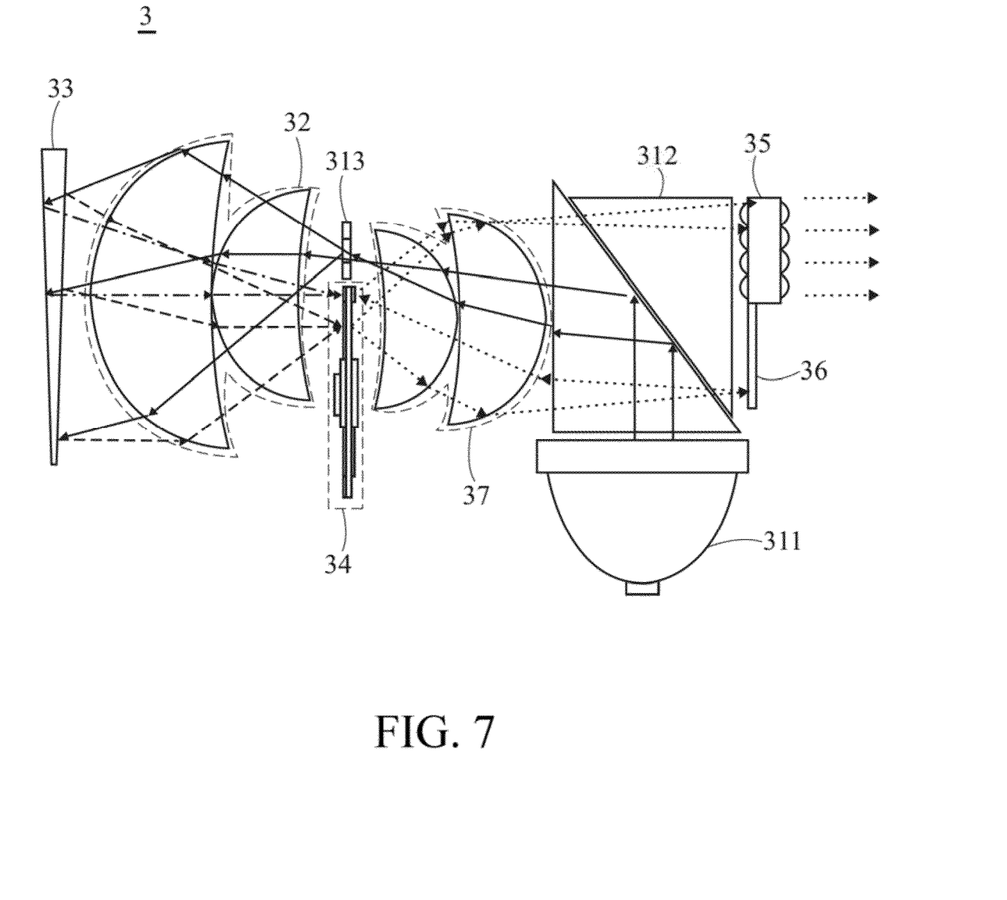
FIG. 7 is a schematic view of the light source system according to the third embodiment of the present invention at a first time sequence.
Figure 8:
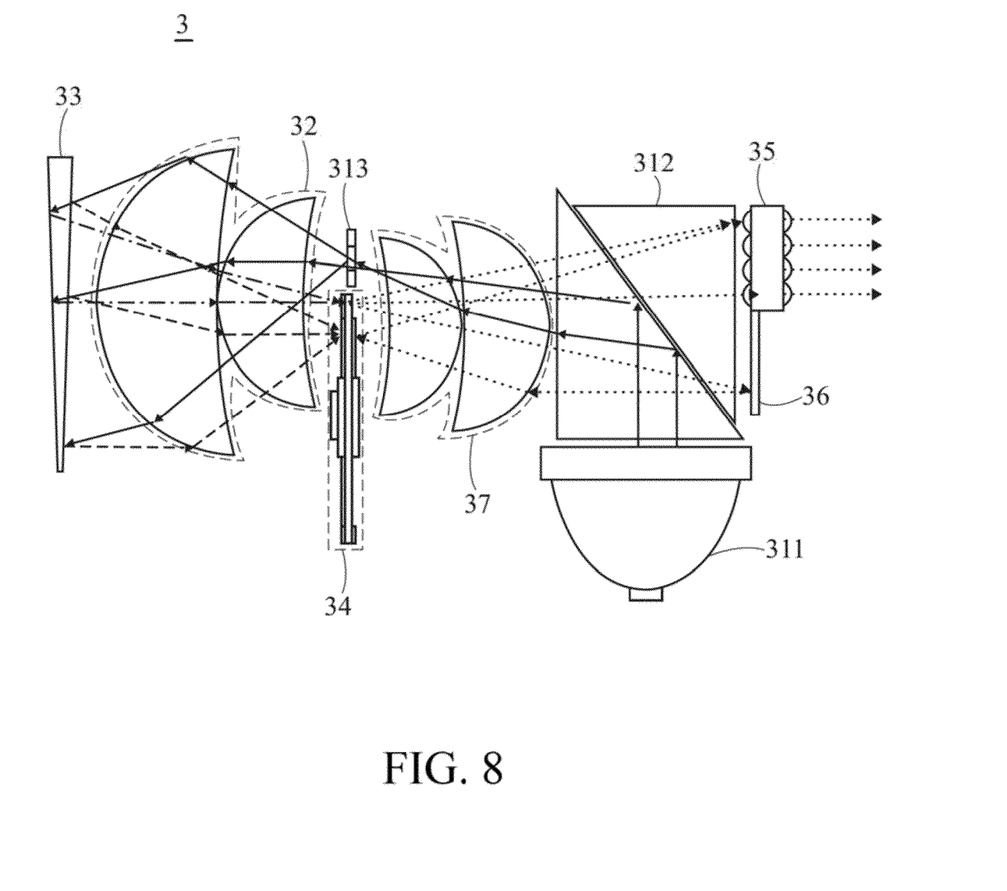
FIG. 8 is a schematic view of the light source system according to the third embodiment of the present invention at a second time sequence.

FIGS. 7 and 8 show schematic views of a light source system 3 according to a third embodiment of the present invention at a first time sequence and a second time sequence respectively. This embodiment differs from the second embodiment in that (1) the prism 312 of this embodiment is a total internal reflection (TIR) prism; and (2) the light integration element 35 of this embodiment is a double lenticular lens.

Hereinafter, only the differences between the third embodiment and the second embodiment will be described, while other relationships and functions of elements will not be further described herein.

In detail, after entering the prism 312 (the TIR prism), the light beam provided by the UHP lamp 311 is transferred into the spatial filter 313. Use of the TIR prism in this embodiment is advantageous in that the TIR prism can readily change the traveling direction of the light beam and make arrangements of the prism 212 or the reflective mirror 112 in the aforesaid two embodiments flexible, and can further reduce the overall volume of the light source system 3. It shall be particularly appreciated that the prism 312 is not disposed in the same plane as the second lens unit 37, the light integration element 35 and the light path transforming element 36; in other words, the third or the fourth light beam exiting from the color wheel module 34 will not enter the prism 312 again.

Furthermore, the light integration element 35 of this embodiment is a double lenticular lens, which can uniformize the third or the fourth light beam entering the light integration element 35 and then provide the uniformized light beam to a projection apparatus (not shown). The double lenticular lens may be comprised of two lenticular lens layers and an all-direction diffuser sandwiched between the two lenticular lens layers, and spacing between the two lenticular lens layers can be adjusted depending on the requirements of the projection apparatus to achieve the desired effect.

Briefly, with the arrangement of the third embodiment, an effect similar to that of the first and the second embodiments can be achieved.

Figure 9:
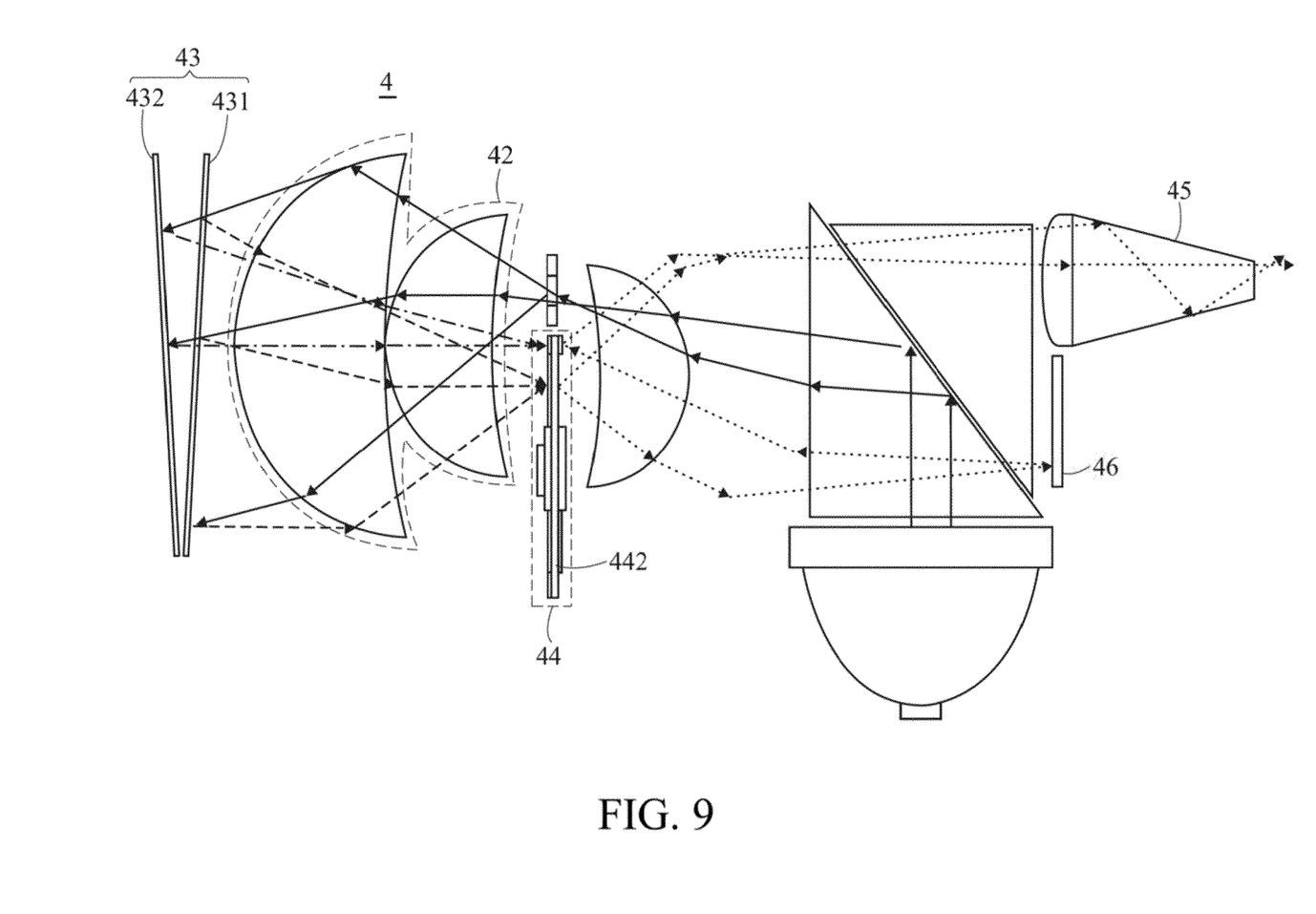
FIG. 9 is a schematic view of the light source system according to the fourth embodiment of the present invention.
Figure 10:
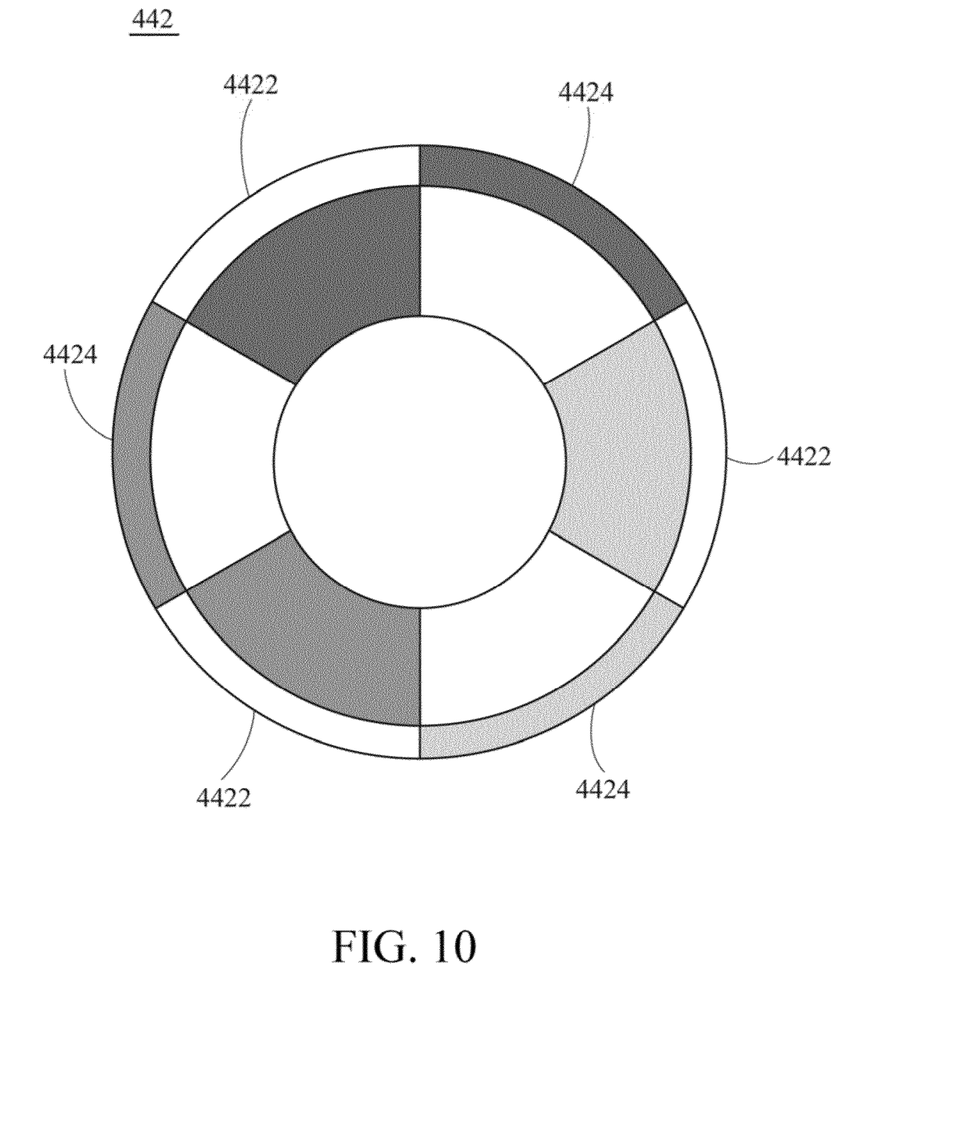
FIG. 10 is a schematic view of a color wheel module of the light source system according to the fourth embodiment of the present invention.

Finally, FIGS. 9 and 10 are schematic views of a light source system 4 according to the present invention and a wheel 442 of a color wheel module 44 thereof respectively. The fourth embodiment differs from the third embodiment in that (1) the light splitting element 43 consists of a first light splitting plate 431 and a second light splitting plate 432; (2) the wheel 442 of the color wheel module 44 comprises first glass pieces 4422 and second glass pieces 4424 arranged alternately; and (3) the light integration element 45 is an integration rod.

Hereinbelow, only the differences between the fourth embodiment and the third embodiment will be described, while other relationships and functions of elements will not be further described herein.

In detail, the first light splitting plate 431 and the second light splitting plate 432 of the light splitting element 43 of the present invention are oblique to each other (an angle, which is preferably 5° to 10°, is included between the first light splitting plate 431 and the second light splitting plate 432). The first light splitting plate 431 and the second light splitting plate 432 are plated with different metal films on surfaces thereof so that the first light splitting plate 431 reflects the first light beam (denoted by the dashed line) with the first bandwidth back into the first lens unit 42 and allows the second light beam (denoted by the chain line) with the second bandwidth to pass therethrough. In this case, the second light beam passing through the first light splitting plate 431 is transmitted to the second light splitting plate 432 and then reflected by the second light splitting plate 432.

The light integration element 45 of this embodiment is adapted to uniformize the third light beam and the fourth light beam transformed by the color wheel module 44, and then provide the third light beam and the fourth light beam to a projection apparatus (not shown) via the light integration element 45. In other words, the light integration element 45 of this embodiment can also achieve an effect similar to the aforesaid embodiments.

With reference to FIG. 10, the wheel 442 of the color wheel module 44 of this embodiment has the first glass pieces 4422 and the second glass pieces 4424 arranged alternately. This make the first time sequence and the second time sequence alternately with each other to achieve an effect similar to that of the aforesaid embodiments.

According to the above descriptions, the light source system of the present invention has the light splitting element optically coupled to the color wheel module and, through its use in combination with a projection apparatus, a stereoscopic image can be provided to the viewer. In this way, the purpose of providing a light source system that has a large light utilization factor, a low cost and a simplified optical arrangement and that eliminates the need of a rotary mechanical member can be achieved.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A light source system for a stereoscopic projection apparatus, comprising:
   a light source module for providing a light beam;
   a first lens unit for receiving the light beam;
   a light splitting element for splitting the light beam into a first light beam with a first bandwidth and a second light beam with a second bandwidth;
   a color wheel module for receiving the first and the second light beams, having a wheel which is comprised of a plurality of first glass pieces and a plurality of second glass pieces arranged radially, wherein each of the first glass pieces includes a first filtering region, a first reflective region and a second reflective region, each of the second glass pieces includes a second filtering region and a third reflective region, the first and the second filtering regions and the first and the third reflective regions are disposed at a first side of the wheel, the first filtering region and the third reflective region are adjacent to an axis of the wheel, and the second reflective region is disposed at a second side of the wheel which is opposite to the first side;
   a light integration element, having a light incident surface and a light exiting surface, wherein the light incident surface is optically coupled to the color wheel module;
   wherein, at a first time sequence, the first light beam is transmitted to the first filtering region of one of the first glass pieces and a third light beam with a third bandwidth of the first light beam passes through the first filtering region, and the second light beam is reflected by the third reflective region of one of the second glass pieces;
   at a second time sequence, the first light beam is reflected by the first reflective region of one of the second glass pieces, and the second light beam is transmitted to the second filtering region of one of the second glass pieces and a fourth light beam with a fourth bandwidth of the second light beam passes through the second filtering region.

2. The light source system of claim 1, wherein the light splitting element is disposed at the first side, the light integration element is disposed at the second side of the wheel, and the light integration element uniformizes the third or the fourth light beam entering the light integration element.

3. The light source system of claim 2, further comprising a light path adjusting element which is disposed at the second side of the wheel, adjacent to the light incident surface of the light integration element, and optically coupled to the second reflective regions of the first glass pieces.

4. The light source system of claim 3, further comprising a second lens unit which is optically coupled to the color wheel module and the light incident surface of the light integration element.

5. The light source system of claim 4, wherein the second lens unit is disposed between the second side of the color wheel module and the light integration element.

6. The light source system of claim 2, further comprising a light path adjusting element which is disposed on the light exiting surface of the light integration element and optically coupled to the second reflective regions of the first glass pieces.

7. The light source system of claim 1, wherein the light integration element is an integration rod or a double lenticular lens.

8. The light source system of claim 3, wherein the light path adjusting element is a lens.

9. The light source system of claim 3, wherein the third light beam is optically coupled to the light path adjusting element and the third reflective region of the first glass piece in sequence.

10. The light source system of claim 1, wherein the first glass pieces are three said first glass pieces, and the second glass pieces are three said second glass pieces.

11. The light source system of claim 10, wherein the first filtering regions of the first glass pieces are a red filtering region, a green filtering region and a blue filtering region, respectively, the second filtering regions of the second glass pieces are a red filtering region, a green filtering region and a blue filtering region, respectively.

12. The light source system of claim 1, wherein the first glass pieces are radially symmetrical to the second glass pieces.

13. The light source system of claim 1, wherein the light source module includes a high pressure mercury lamp, a reflective mirror and a spatial filter, the high pressure mercury lamp is used for providing the light beam, and the reflective mirror and the spatial filter is used for transmitting the light beam to the first lens unit.

14. The light source system of claim 1, wherein the light source module includes a high pressure mercury lamp, a prism and a spatial filter, the high pressure mercury lamp is used for providing the light beam, and the prism and the spatial filter is used for transmitting the light beam to the first lens unit.

15. The light source system of claim 14, wherein the prism is a total internal reflection (TIR) prism.

16. The light source system of claim 1, wherein the light splitting element includes a first light splitting plate and a second light splitting plate which is oblique to the first light splitting plate, the first light splitting plate reflects the first light beam with the first bandwidth and allows the second light beam with the second bandwidth to pass therethrough, and the passed second light beam is transmitted to the second light splitting plate and then reflected by the second light splitting plate.

17. The light source system of claim 1, wherein the light splitting element is a wedge reflector including a filtering surface and a reflective surface which is oblique to the filtering surface, the filtering surface is used to allow the second light beam to pass therethrough and reflect the first light beam, and the second light beam passing the filtering surface is reflected by the reflective surface.

18. The light source system of claim 1, wherein the first lens unit is disposed at the first side of the color wheel module.

* * * * *